April 4, 1950     G. H. COOK     2,502,509
WIDE APERTURE CORRECTED OPTICAL OBJECTIVES COMPRISING
TWO MEMBERS FORMED OF FOUR AIR SPACED COMPONENTS
Filed Dec. 27, 1948
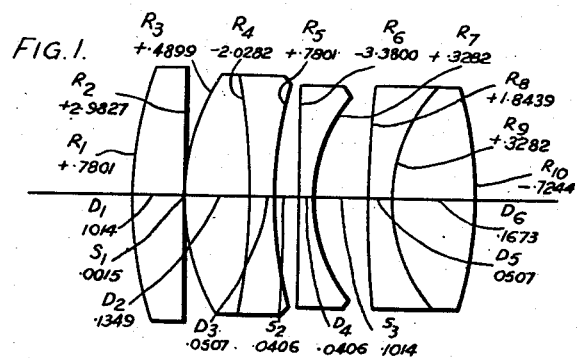
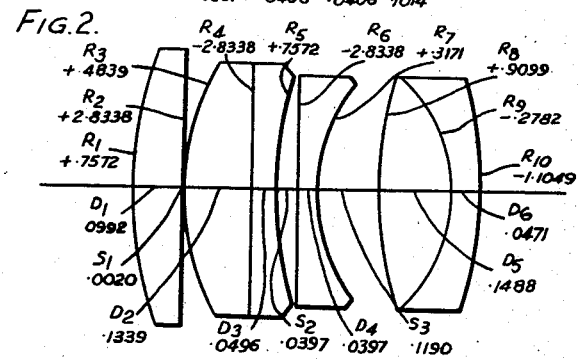
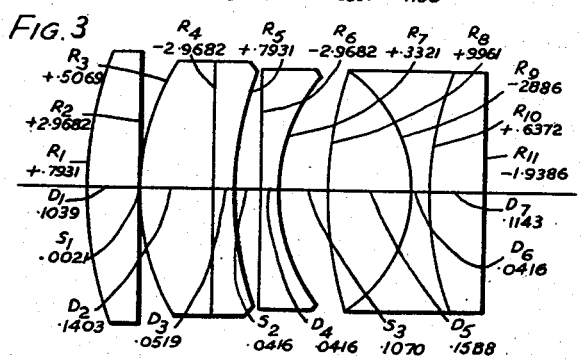
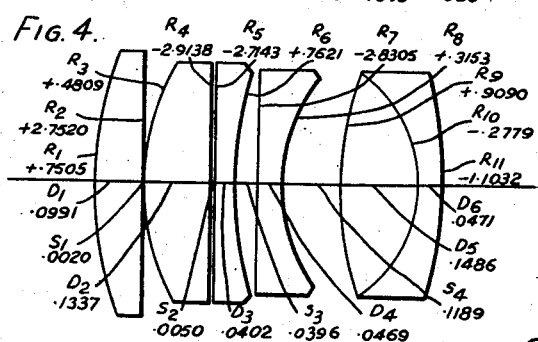
Inventor
Gordon H. Cook
By Emery, Holcombe & Blair
Attorneys Patented Apr. 4, 1950

2,502,509

UNITED STATES PATENT OFFICE 2,502,509

WIDE APERTURE CORRECTED OPTICAL OBJECTIVES COMPRISING TWO MEMBERS FORMED OF FOUR AIR SPACED COMPONENTS

Gordon Henry Cook, Leicester, England, assignor to Taylor, Taylor & Hobson Limited, Leicester, England, a company of Great Britain Application December 27, 1948, Serial No. 67,301
In Great Britain November 29, 1948

17 Claims. (Cl. 88—57)

This invention relates to an optical objective for photographic or other purposes, corrected for spherical and chromatic aberrations, coma, astigmatism, field curvature and distortion, and has for its object to provide a wide-aperture objective having its aberrations highly corrected over a medium field and in particular having good correction for oblique spherical aberration and zonal coma. This also permits, if desired, an increase in the diameters of the various components beyond those necessary for the axial beam alone, in order to increase the amount of photographically useful light reaching extraaxial image points, whilst still maintaining off-axis aberrations within close limits.

The objective according to the invention comprises two members, of which the rear member is convergent with focal length greater than a half and less than four-fifths of the equivalent focal length of the whole objective and includes at least one convergent element and at least one divergent element, whilst the front member, whose focal length whether convergent or divergent is greater than five times the equivalent focal length of the whole objective, consists of a convergent doublet behind a simple convergent component and in front of a simple divergent component, such convergent doublet having a collective internal contact surface concave to the front of radius of curvature greater than the equivalent focal length of the objective, the mean refractive index of the material of the front element of such doublet exceeding that of the rear element thereof, the focal lengths of the two convergent components of the front member each being greater than the equivalent focal length of the whole objective and less than twice such focal length, whilst the focal length of the divergent component of the front member is greater than a third and less than three-fifths of such equivalent focal length. The mean refractive index of the material of the front element of the convergent doublet is preferably greater than 1.64.

It should be made clear that the term "internal contact surface" is used herein, whether or not the cooperating surfaces of the elements are cemented together and whether or not such surfaces have exactly the same curvature. In the case of a "broken" contact, where the two cooperating surfaces have slightly different radii of curvature, the radius of curvature of the internal contact surface is to be taken to be the harmonic mean between the two radii.

The rear member may be arranged in various ways, but in its simplest form may consist of a doublet having a collective internal contact surface. Such surface is preferably cemented and may be convex or concave to the front.

In the former case, when the cemented surface is convex to the front, the mean refractive index of the material of the rear element of the doublet should exceed that of the front element thereof by at least .06, the radius of curvature of the cemented surface being less than half and greater than a fifth of the equivalent focal length of the objective. The front surface of the doublet is preferably convex to the front with radius of curvature between one and four times the equivalent focal length of the objective and greater than that of the rear surface of doublet, such rear surface being concave to the front.

When the cemented surface is concave to the front, the mean refractive index of the material of the front element of the doublet should exceed that of the rear element by at least 0.6, the radius of curvature of the cemented surface being less than half and greater than a fifth of the equivalent focal length of the objective. In this case the radius of curvature of the front surface of the doublet preferably lies between a half and twice the equivalent focal length of the objective, such surface being convex to the front, whilst the radius of curvature of the rear surface of the doublet is greater than three-quarters of such equivalent focal length, such rear surface being concave to the front.

In an alternative arrangement, the rear member consists of a triplet having both its internal contact surfaces collective. Conveniently, the triplet consists of two convergent elements and one divergent element, one of the two internal contact surfaces being concave to the front and the other convex thereto. The two internal contact surfaces are preferably cemented, the radius of curvature of the concave surface lying between a fifth and a half of the equivalent focal length of the objective and that of the convex surface between two-fifths and one times such focal length, whilst the mean refractive indices of the materials of the two convergent elements exceed that of the divergent element by at least .06. The front surface of the triplet is preferably convex to the front with radius of curvature between a half and twice the equivalent focal length of the objective, the rear surface of the triplet being concave to the front with radius of curvature greater than that of the front surface thereof.

Figures 1–4 of the accompanying drawings respectively show four convenient practical examples of objective according to the invention, and numerical data for these examples are given in the following tables, in which $R_1$ $R_2$ . . . represent the radii of curvature of the individual surfaces of the objective counting from the front, the positive sign indicating that the surface is convex to the front and the negative sign that it is concave thereto, $D_1$ $D_2$ . . . represent the axial thicknesses of the various elements, and $S_1$ $S_2$ . . . represent the axial air separations between the components. The tables also give the mean refractive indices $n_D$ for the D-line and also the Abbé V numbers of the materials of which the individual elements are made.

EXAMPLE I

| Equivalent focal length 1.000. Relative Aperture F/2.0 | | | |
|---|---|---|---|
| Radius | Thickness or Air Separation | Refractive Index $n_D$ | Abbé V Number |
| $R_1$+ .7801 | $D_1$ .1014 | 1.6909 | 54.9 |
| $R_2$+2.9827 | $S_1$ .0015 | | |
| $R_3$+ .4899 | $D_2$ .1349 | 1.6909 | 54.9 |
| $R_4$−2.0282 | $D_3$ .0507 | 1.6227 | 36.0 |
| $R_5$+ .7801 | $S_2$ .0406 | | |
| $R_6$−3.3800 | $D_4$ .0406 | 1.6535 | 33.5 |
| $R_7$+ .3282 | $S_3$ .1014 | | |
| $R_8$+1.8439 | $D_5$ .0507 | 1.5890 | 61.4 |
| $R_9$+ .3282 | $D_6$ .1673 | 1.6909 | 54.9 |
| $R_{10}$− .7244 | | | |

EXAMPLE II

| Equivalent focal length 1.000. Relative Aperture F/1.86 | | | |
|---|---|---|---|
| Radius | Thickness or Air Separation | Refractive Index $n_D$ | Abbé V Number |
| $R_1$+ .7572 | $D_1$ .0992 | 1.6909 | 54.9 |
| $R_2$+2.8338 | $S_1$ .0020 | | |
| $R_3$+ .4839 | $D_2$ .1339 | 1.6909 | 54.9 |
| $R_4$−2.8338 | $D_3$ .0496 | 1.6227 | 36.0 |
| $R_5$+ .7572 | $S_2$ .0397 | | |
| $R_6$−2.8338 | $D_4$ .0397 | 1.6535 | 33.5 |
| $R_7$+ .3171 | $S_3$ .1190 | | |
| $R_8$+ .9099 | $D_5$ .1488 | 1.6909 | 54.9 |
| $R_9$− .2782 | $D_6$ .0471 | 1.5890 | 61.4 |
| $R_{10}$−1.1049 | | | |

EXAMPLE III

| Equivalent focal length 1.000. Relative Aperture F/1.86 | | | |
|---|---|---|---|
| Radius | Thickness or Air Separation | Refractive Index $n_D$ | Abbé V Number |
| $R_1$+ .7931 | $D_1$ .1039 | 1.6909 | 54.9 |
| $R_2$+2.9682 | $S_1$ .0021 | | |
| $R_3$+ .5069 | $D_2$ .1403 | 1.6909 | 54.9 |
| $R_4$−2.9682 | $D_3$ .0519 | 1.6227 | 36.0 |
| $R_5$+ .7931 | $S_2$ .0416 | | |
| $R_6$−2.9682 | $D_4$ .0416 | 1.6535 | 33.5 |
| $R_7$+ .3321 | $S_3$ .1070 | | |
| $R_8$+ .9961 | $D_5$ .1588 | 1.6909 | 54.9 |
| $R_9$− .2886 | $D_6$ .0416 | 1.5740 | 52.0 |
| $R_{10}$+ .6372 | $D_7$ .1143 | 1.7170 | 48.0 |
| $R_{11}$−1.9386 | | | |

EXAMPLE IV

| Equivalent focal length 1.000. Relative Aperture F/1.86 | | | |
|---|---|---|---|
| Radius | Thickness or Air Separation | Refractive Index $n_D$ | Abbé V Number |
| $R_1$+ .7505 | $D_1$ .0991 | 1.6915 | 55.0 |
| $R_2$+2.7520 | $S_1$ .0020 | | |
| $R_3$+ .4809 | $D_2$ .1337 | 1.6915 | 55.0 |
| $R_4$−2.9138 | $S_2$ .0050 | | |
| $R_5$−2.7143 | $D_3$ .0402 | 1.6227 | 36.0 |
| $R_6$+ .7621 | $S_3$ .0396 | | |
| $R_7$−2.8305 | $D_4$ .0469 | 1.6535 | 33.5 |
| $R_8$+ .3153 | $S_4$ .1189 | | |
| $R_9$+ .9090 | $D_5$ .1486 | 1.6915 | 55.0 |
| $R_{10}$− .2779 | $D_6$ .0471 | 1.5886 | 61.3 |
| $R_{11}$−1.1032 | | | |

Examples I, II and III differ from one another primarily in the arrangement of the rear member. In Examples I and II the rear member is in the form of a cemented doublet, the cemented surface $R_9$ being convex to the front in Example I and concave to the front in Example II. In Example III the rear member consists of a cemented triplet, the front cemented surface $R_9$ being concave to the front and the rear cemented surface $R_{10}$ convex to the front, both surfaces being collective.

In these three examples, the front member has three components of which the first is simple and convergent and the third simple and divergent, whilst the middle component consists of a convergent doublet containing a convergent element cemented in front of a divergent element, the cemented surface being collective and concave to the front with an index difference of .0682 across it.

It is not essential to the invention that the internal contact surfaces in the compound components should be cemented, and it may be convenient in some instances to employ "broken" contacts, wherein the two cooperating surfaces have slightly different radii of curvature. Example IV above is one example of such a modification and differs from Example II in that the doublet middle component of the front member has its internal contact broken instead of cemented. The effective radius of curvature of such broken contact is the harmonic mean between the radii $R_4$ and $R_5$, that is 2.8105 times the equivalent focal length of the objective.

The ratios of the focal lengths of the individual members and components to the equivalent focal length of the whole objective in these four examples are for convenience, set out in the following table, the positive sign indicating convergent power and the negative sign divergent power:

Table of focal lengths

|  | Ex. I | Ex. II | Ex. III | Ex. IV |
|---|---|---|---|---|
| Complete front member | +16.0 | ∞ | ∞ | +99.0 |
| Front component thereof | +1.50 | +1.47 | +1.54 | +1.46 |
| Middle component thereof | +1.30 | +1.32 | +1.39 | +1.32 |
| Rear component thereof | −.46 | −.43 | −.45 | −.43 |
| Complete rear member | +.66 | +.60 | +.63 | +.63 |

It will be noticed that, throughout all the examples, the mean refractive index of each convergent element of a compound component exceeds that of the divergent element associated with it in the same component by more than .06.

In all the examples, the rear member as a whole is double-convex. In Example I the convergent element in the rear doublet is located behind the divergent element, the reverse arrangement being employed in Examples II and IV, the radius of curvature of the cemented surface (or the equivalent radius of curvature of the broken contact) in each case being less than half the equivalent focal length of the whole objective. In Example III the triplet rear member consists of a divergent element between two convergent elements, the front cemented surface being strongly curved.

What I claim as my invention and desire to secure by Letters Patent is:

1. An optical objective for photographic or other purposes, corrected for spherical and chromatic aberrations, coma, astigmatism, field curvature and distortion, and comprising two members, of which the rear member is convergent with focal length greater than half and less than four-fifths of the equivalent focal length of the whole objective and includes at least one convergent element and at least one divergent element, whilst the front member, whose focal length is greater than five times the equivalent focal length of the whole objective in either direction, consists of a convergent doublet behind a simple convergent component and in front of a simple divergent component, such convergent doublet having a collective internal contact surface concave to the front of radius of curvature greater than the equivalent focal length of the objective, the mean refractive index of the material of the front element of such doublet exceeding that of the rear element thereof, the focal lengths of the two convergent components of the front member each being greater than the equivalent focal length of the whole objective, and less than twice such focal length, whilst the focal length of the divergent component of the front member is greater than a third and less than three-fifths of such equivalent focal length.

2. An optical objective as claimed in claim 1, in which the mean refractive index of the material of the front element of the convergent doublet in the front member is greater than 1.64, and the radius of curvature of the front surface of the convergent doublet of the front member lies between .4 and .6 time the equivalent focal length of the objective.

3. An optical objective as claimed in claim 2, in which the rear member consists of a doublet having a collective internal contact surface.

4. An optical objective as claimed in claim 1, in which the mean refractive index of the material of the front element of the convergent doublet in the front member is greater than 1.64, and the rear member consists of a triplet having both its internal contact surfaces collective.

5. An optical objective for photographic or other purposes corrected for spherical and chromatic aberrations, coma, astigmatism, field curvature and distortion, and comprising two members, of which the rear member consists of a convergent doublet having a collective internal contact surface and having focal length greater than half and less than four-fifths of the equivalent focal length of the whole objective, whilst the front member, whose focal length is greater than five times the equivalent focal length of the whole objective in either direction, consists of a convergent doublet behind a simple convergent component and in front of a simple divergent component, such convergent doublet having a collective internal contact surface concave to the front of radius of curvature greater than the equivalent focal length of the objective, the mean refractive index of the material of the front element of such doublet exceeding that of the rear element thereof, the focal lengths of the two convergent components of the front member each being greater than the equivalent focal length of the whole objective, and less than twice such focal length, whilst the focal length of the divergent component of the front member is greater than a third and less than three-fifths of such equivalent focal length.

6. An optical objective as claimed in claim 5, in which the internal contact surface in the doublet rear member is cemented and convex to the front with radius of curvature less than half and greater than a fifth of the equivalent focal length of the objective, the mean refractive index of the material of the rear element of such doublet exceeding that of the front element thereof by more than .06.

7. An optical objective as claimed in claim 6, in which the front surface of the doublet rear member is convex to the front with radius of curvature between one and four times the equivalent focal length of the objective and greater than that of the rear surface of the doublet, such rear surface being concave to the front.

8. An optical objective as claimed in claim 5, in which the internal contact surface in the doublet rear member is cemented and concave to the front with radius of curvature less than half and greater than a fifth of the equivalent focal length of the objective, the mean refractive index of the material of the front element of such doublet exceeding that of the rear element thereof by more than .06.

9. An optical objective as claimed in claim 5, in which the internal contact surface in the doublet rear member is cemented and concave to the front with radius of curvature less than half and greater than one-fifth of the equivalent focal length of the objective, the mean refractive index of the material of the front element of such doublet exceeding that of the rear element thereof by more than .06, the front surface of the doublet rear member is convex to the front with radius of curvature greater than a half and less than twice the equivalent focal length of the objective, whilst the rear surface of the doublet is concave to the front and has radius of curvature greater than three-quarters of such equivalent focal length.

10. An optical objective for photographic or other purposes, corrected for spherical and chromatic aberrations, coma, astigmatism, field curvature and distortion, and comprising two members, of which the rear member consists of a convergent triplet having both its internal contact surfaces collective and having focal length greater than half and less than four-fifths of the equivalent focal length of the whole objective, whilst the front member, whose focal length is greater than five times the equivalent focal length of the whole objective in either direction, consists of a convergent doublet behind a simple convergent component and in front of a simple divergent component, such convergent doublet having a collective internal contact surface concave to the front of radius of curvature greater than the equivalent focal length of the objective, the mean refractive index of the material of the front element of such doublet exceeding that of the rear element thereof, the focal lengths of the two convergent components of the front member each being greater than the equivalent focal length of the whole objective, and less than twice such focal length, whilst the focal length of the divergent component of the front member is greater than a third and less than three-fifths of such equivalent focal length.

11. An optical objective as claimed in claim 10, in which the triplet rear member consists of two convergent elements and one divergent element, one of the two internal contact surfaces being concave to the front and the other convex to the front.

12. An optical objective as claimed in claim 11, in which the two internal contact surfaces in the triplet rear member are cemented, the radius of curvature of the concave contact surface lying between a fifth and a half of the equivalent focal length of the objective and that of the convex contact surface between two-fifths and one times such focal length, whilst the mean refractive indices of the materials of the two convergent elements exceed that of the divergent element by at least .06.

13. An optical objective as claimed in claim 12, in which the front surface of the triplet rear member is convex to the front with radius of curvature between a half and twice the equivalent focal length of the objective, whilst the radius of curvature of the rear surface of the triplet is greater than that of the front surface thereof, such rear surface being concave to the front.

14. An optical objective as claimed in claim 10, in which the triplet rear member consists of two convergent elements and one divergent element, one of the two internal contact surfaces being concave to the front and the other convex to the rear, and the front surface of the triplet rear member is convex to the front with radius of curvature between a half and twice the equivalent focal length of the objective, whilst the radius of curvature of the rear surface of the triplet is greater than that of the front surface thereof, such rear surface being concave to the front.

15. An optical objective for photographic or other purposes, corrected for spherical and chromatic aberrations, coma, astigmatism, field curvature and distortion, having numerical data substantially as set forth in the following table:

| Radius | Thickness or Air Separation | Refractive Index $n_D$ | Abbé V Number |
|---|---|---|---|
| $R_1 + .7801$ | $D_1$ .1014 | 1.6909 | 54.9 |
| $R_2 +2.9827$ | $S_1$ .0015 | | |
| $R_3 + .4899$ | $D_2$ .1349 | 1.6909 | 54.9 |
| $R_4 -2.0282$ | $D_3$ .0507 | 1.6227 | 36.0 |
| $R_5 + .7801$ | $S_2$ .0406 | | |
| $R_6 -3.3800$ | $D_4$ .0406 | 1.6535 | 33.5 |
| $R_7 + .3282$ | $S_3$ .1014 | | |
| $R_8 +1.8439$ | $D_5$ .0507 | 1.5890 | 61.4 |
| $R_9 + .3282$ | $D_6$ .1673 | 1.6909 | 54.9 |
| $R_{10} - .7244$ | | | |

Equivalent focal length 1.000. Relative Aperture F/2.0 wherein $R_1$, $R_2$, ... indicate the radii of the individual surfaces counting from the front, $D_1$, $D_2$, ... indicate the axial thicknesses of the individual elements and $S_1$, $S_2$, ... indicate the axial air separations between the components.

16. An optical objective for photographic or other purposes, corrected for spherical and chromatic aberrations, coma, astigmatism, field curvature and distortion, having numerical data substantially as set forth in the following table:

| Radius | Thickness or Air Separation | Refractive Index $n_D$ | Abbé V Number |
|---|---|---|---|
| $R_1 + .7572$ | $D_1$ .0992 | 1.6909 | 54.9 |
| $R_2 +2.8338$ | $S_1$ .0020 | | |
| $R_3 + .4839$ | $D_2$ .1339 | 1.6909 | 54.9 |
| $R_4 -2.8338$ | $D_3$ .0496 | 1.6227 | 36.0 |
| $R_5 + .7572$ | $S_2$ .0397 | | |
| $R_6 -2.8338$ | $D_4$ .0397 | 1.6535 | 33.5 |
| $R_7 + .3171$ | $S_3$ .1190 | | |
| $R_8 + .9099$ | $D_5$ .1488 | 1.6909 | 54.9 |
| $R_9 - .2782$ | $D_6$ .0471 | 1.5890 | 61.4 |
| $R_{10} -1.1049$ | | | |

Equivalent focal length 1.000. Relative Aperture F/1.86 wherein $R_1$, $R_2$, ... indicate the radii of the individual surfaces counting from the front, $D_1$, $D_2$, ... indicate the axial thicknesses of the individual elements and $S_1$, $S_2$, ... indicate the axial air separations between the components.

17. An optical objective for photographic or other purposes, corrected for spherical and chromatic aberrations, coma, astigmatism, field curvature and distortion, having numerical data substantially as set forth in the following table:

| Equivalent focal length 1.000. Relative Aperture F/1.86 | | | |
|---|---|---|---|
| Radius | Thickness or Air Separation | Refractive Index $n_D$ | Abbé V Number |
| $R_1 + .7931$ | | | |
| | $D_1$ .1039 | 1.6909 | 54.9 |
| $R_2 + 2.9682$ | | | |
| | $S_1$ .0021 | | |
| $R_3 + .5069$ | | | |
| | $D_2$ .1403 | 1.6909 | 54.9 |
| $R_4 - 2.9682$ | | | |
| | $D_3$ .0519 | 1.6227 | 36.0 |
| $R_5 + .7931$ | | | |
| | $S_2$ .0416 | | |
| $R_6 - 2.9682$ | | | |
| | $D_4$ .0416 | 1.6535 | 33.5 |
| $R_7 + .3321$ | | | |
| | $S_3$ .1070 | | |
| $R_8 + .9961$ | | | |
| | $D_5$ .1588 | 1.6909 | 54.9 |
| $R_9 - .2886$ | | | |
| | $D_6$ .0416 | 1.5740 | 52.0 |
| $R_{10} + .6372$ | | | |
| | $D_7$ .1143 | 1.7170 | 48.0 |
| $R_{11} - 1.9386$ | | | | wherein $R_1$, $R_2$, . . . indicate the radii of the individual surfaces counting from the front, $D_1$, $D_2$, . . . indicate the axial thicknesses of the individual elements and $S_1$, $S_2$, . . . indicate the axial air separations between the components.

GORDON HENRY COOK.

REFERENCES CITED

The following references are of record in the file of this patent:

UNITED STATES PATENTS

| Number | Name | Date |
|---|---|---|
| 2,076,686 | Tronnier | Apr. 13, 1937 |
| 2,259,004 | Schade | Oct. 14, 1941 |
| 2,366,661 | Warmisham | Jan. 2, 1945 |

FOREIGN PATENTS

| Number | Country | Date |
|---|---|---|
| 555,404 | Great Britain | Aug. 20, 1943 |